(12) United States Patent
Kalynushkin et al.

(10) Patent No.: US 7,972,731 B2
(45) Date of Patent: Jul. 5, 2011

(54) ELECTRODE FOR CELL OF ENERGY STORAGE DEVICE AND METHOD OF FORMING THE SAME

(75) Inventors: Yevgen Kalynushkin, Pompano Beach, FL (US); Peter Novak, Ft. Lauderdale, FL (US)

(73) Assignees: Enerl, Inc., New York, NY (US); Nanoener Technologies, Inc., Ft. Lauderdale, FL (US)

( * ) Notice: Subject to any disclaimer, the term of this patent is extended or adjusted under 35 U.S.C. 154(b) by 1084 days.

(21) Appl. No.: 11/561,077

(22) Filed: Nov. 17, 2006

(65) Prior Publication Data

US 2007/0224513 A1 Sep. 27, 2007

Related U.S. Application Data

(63) Continuation-in-part of application No. 11/560,922, filed on Nov. 17, 2006, now Pat. No. 7,717,968.

(60) Provisional application No. 60/780,240, filed on Mar. 8, 2006.

(51) Int. Cl.
*H01M 4/80* (2006.01)
(52) U.S. Cl. .................... 429/235; 429/233; 429/209
(58) Field of Classification Search .................. None
See application file for complete search history.

(56) References Cited

U.S. PATENT DOCUMENTS

| | | | |
|---|---|---|---|
| 4,815,414 A | 3/1989 | Duffy et al. | |
| 5,302,414 A | 4/1994 | Alkhimov et al. | |
| 5,795,680 A * | 8/1998 | Ikeda et al. | 429/245 |
| 6,402,050 B1 | 6/2002 | Kashirin et al. | |
| 6,475,664 B1 * | 11/2002 | Kawakami et al. | 429/137 |
| 6,544,689 B1 * | 4/2003 | Riley et al. | 429/302 |
| 6,679,926 B1 * | 1/2004 | Kajiura et al. | 29/623.1 |
| 6,706,431 B2 | 3/2004 | Kawamura et al. | |
| 6,761,744 B1 | 7/2004 | Tsukamoto et al. | |
| 6,800,399 B2 | 10/2004 | Matsumoto | |
| 2002/0177032 A1 | 11/2002 | Suenaga et al. | |
| 2003/0203282 A1 | 10/2003 | Grugeon et al. | |
| 2004/0137326 A1 | 7/2004 | Munshi | |
| 2004/0185343 A1 | 9/2004 | Wang et al. | |
| 2004/0191607 A1 | 9/2004 | Nobuta et al. | |
| 2004/0197654 A1 | 10/2004 | Barker et al. | |
| 2004/0202937 A1 | 10/2004 | Barker et al. | |
| 2004/0248010 A1 | 12/2004 | Kato et al. | |
| 2005/0191555 A1 | 9/2005 | Kelley et al. | |
| 2006/0051677 A1 | 3/2006 | Matsushima et al. | |
| 2006/0175704 A1 * | 8/2006 | Shimizu et al. | 257/758 |

FOREIGN PATENT DOCUMENTS

JP 2006-59641 A 3/2006
WO WO 2005/006469 * 1/2005

* cited by examiner

*Primary Examiner* — Cynthia Lee
(74) *Attorney, Agent, or Firm* — Novak, Druce + Quigg, LLP; Joseph W. Bain

(57) ABSTRACT

A method of the present invention is used for the high-rate deposition of materials, such as carbon, silicon, metals, metal oxides, and the like, onto a metal substrate defined by a metal current collector. The particles of the material are mixed with fluid and are injected against the metal tape at high pressure and high velocity. The particles of the material form an active layer of the metal current collector. The metal current collector is used as a cathode or anode combined with a separator to form a cell of a secondary battery, metal-ceramic membranes, film composite metal-ceramic materials for electronic devices.

6 Claims, 12 Drawing Sheets

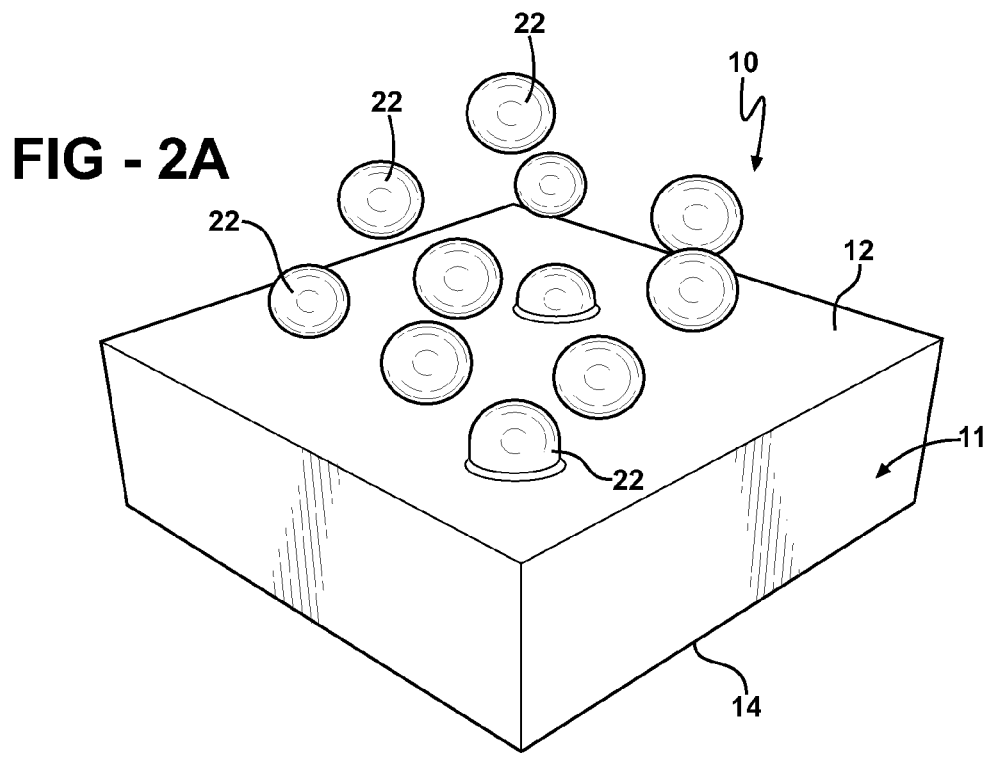
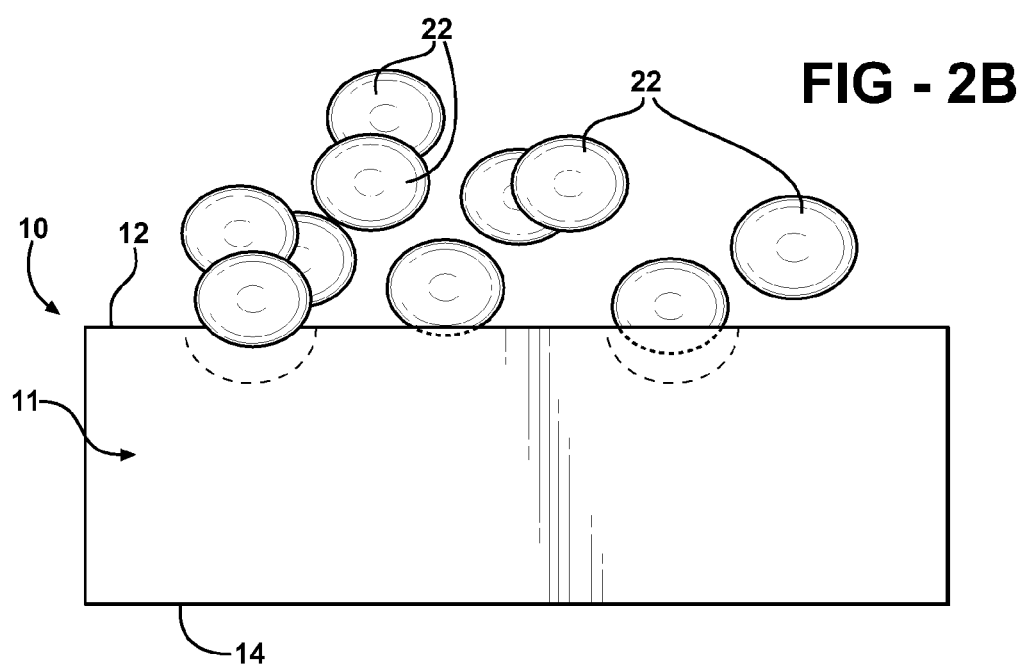

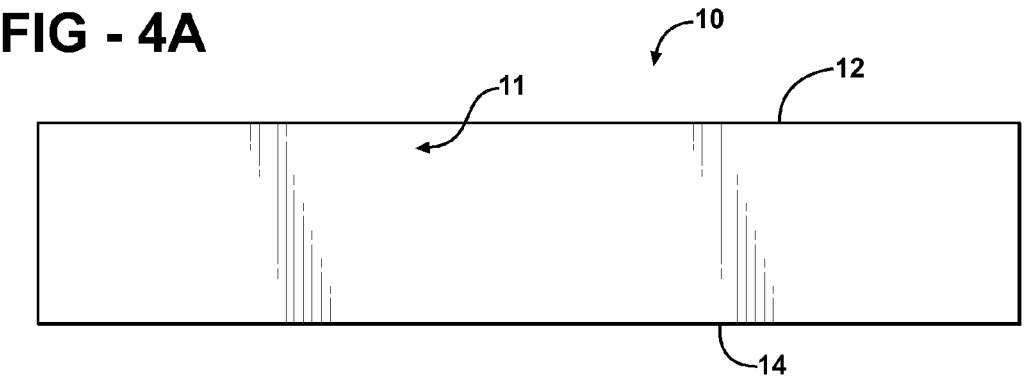
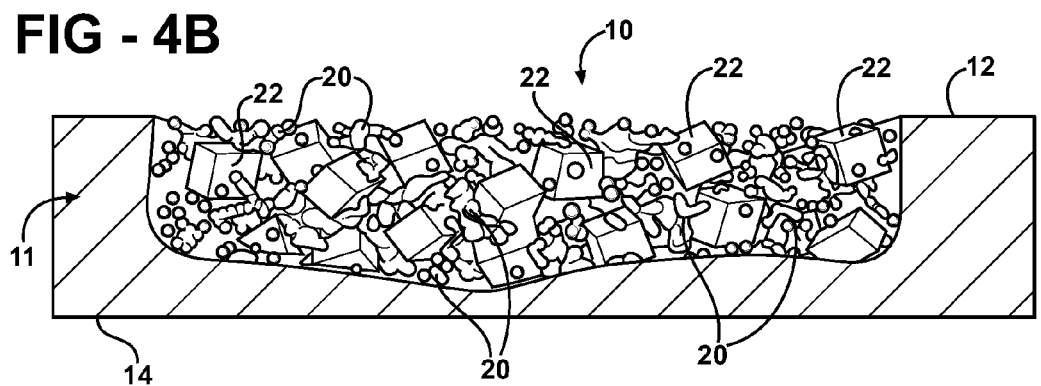
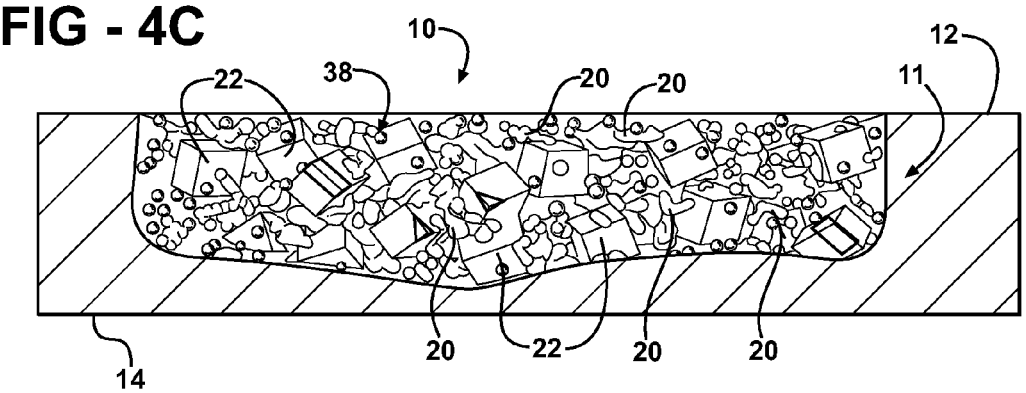

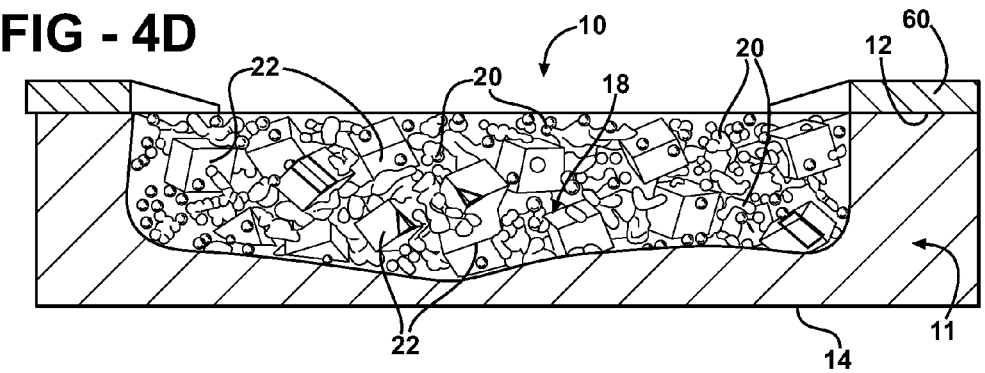
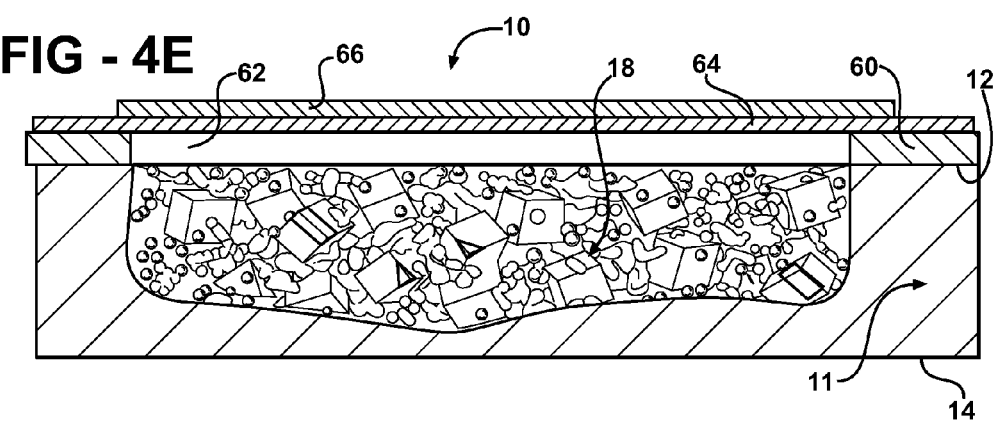
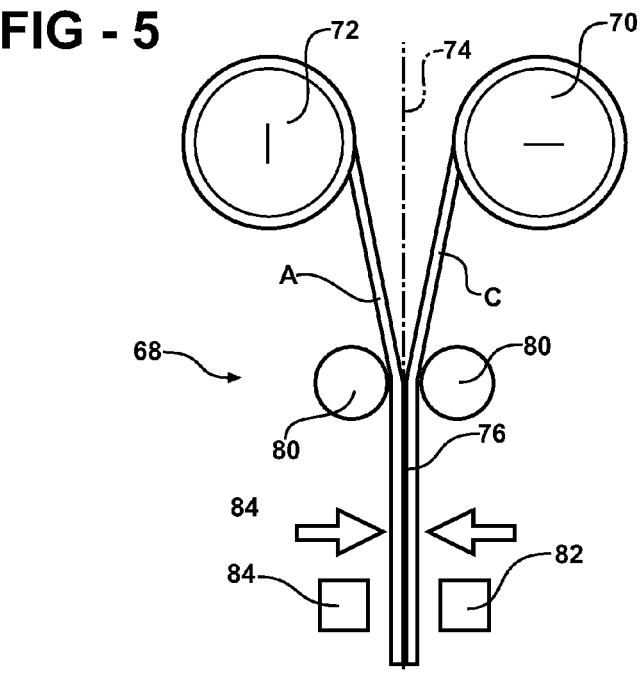

ELECTRODE FOR CELL OF ENERGY STORAGE DEVICE AND METHOD OF FORMING THE SAME

RELATED APPLICATIONS

This is a continuation-in-part application of a non-provisional patent application Ser. No. 11/560,922 filed on Nov. 17, 2006 now U.S. Pat. No. 7,717,968 which claims priority to a provisional patent application Ser. No. 60/780,240 filed on Mar. 8, 2006 and incorporated herewith in its entirety.

FIELD OF THE INVENTION

The subject invention relates to an electrode for a cell of an electrochemical device having improved cell charged capacity, recycling stability, energy and power, method for manufacturing the same.

BACKGROUND OF THE INVENTION

The term "nanotechnology" generally refers to objects, systems, mechanisms and assemblies smaller than 100 nanometers and larger than 1 nm. In recent years nanotechnology has been used to make products, that is, raw materials are processed and manipulated until the desired product is achieved. In contrast, nanotechnology mimics nature by building a product from the ground up using a basic building block—the atom. In nanotechnology atoms are arranged to create the material needed to create other products. Additionally, nanotechnology allows for making materials stronger and lighter such as carbon nano-tube composite fibers.

One of the areas of continuous development and research is an area of energy conversion devices, such as for example secondary batteries capable of charging electricity after discharge and having at least one electrochemical cell. The cell includes a pair of electrodes and an electrolyte disposed between the electrodes. One of the electrodes is called a cathode wherein an active material is reduced during discharge. The other electrode is called an anode wherein another active material is oxidized during discharge. Secondary batteries refer to batteries capable of charging electricity after discharge. Recently, intensive research has been conducted on lithium secondary batteries because of their high voltage and high energy density. The typical lithium battery having an anode containing an active material for releasing lithium ions during discharge. The active material may be metallic lithium and an intercalated material being capable of incorporating lithium between layers. The active material is deposited or coated upon a metal current collector formed from a metal tape to increase electro-conductive characteristics of at least one of the electrodes.

Alluding to the above, various methods for deposition of the active materials onto the metal current collector have been used in the prior art applications. One of these methods is physical vapor deposition (PVD), which includes E-beam evaporation, filament evaporation and different sputtering deposition, is currently used to generate thin films on substrates, i.e. the metal current collector. However, this method includes numerous disadvantages, such as, for example, non-time effective deposition rates as relate to coating thickness of the substrate per unit, typically in the range of a few microns per minute. Another method is known as chemical vapor deposition (CVD), including rapid thermal CVD, or RT CVD, results non-time effective deposition of the coating onto the substrate. Sputtering techniques such as RF or DC sputtering, as well as laser evaporation, plasma arc evaporation, electro-spark deposition (ESD), and the like are also known to have low deposition rates. In addition, all of the aforementioned methods are performed by and require expensive vacuum equipment and do not provide strong adhesion of the coating to the substrate, which is detrimental in various applications, particularly in manufacturing electrodes for energy conversion devices, such as batteries.

These aforementioned methods are proven to achieve rates of tens of microns per minute. However, if the deposition rates of these methods are increased to higher rates, it may adversely impact adhesion of the coating upon the substrate. As such, these methods are limited to deposition of the coating that results in a range of 10-20 µm per minute, which has limited industrial application, such as to production of a very thin battery of the type used in electronic devices. However, these prior art methods are not cost effective when used in a production of other types of batteries, such as, for example, batteries for vehicles, and the like.

Alluding to the above, another method, which used vacuum, was also applied in fabrication of the substances of the electrodes. However, this method had negatively impacted the crystalline composition of the materials deposited upon the substrate. Those skilled in the art will appreciate that a shortage of oxygen in spinel phases leads to transformation of cubic crystal matrix to tetragonal one, which negatively affects electrochemical properties. The usage of carbon as a conductive agent, in some of the prior art applications, presents numerous disadvantages because of the lower electrical conductivity of the carbon as compared to metals, thereby creating additional voltage drop at the interface with the metal current collector.

The art is replete with various other methods and apparatuses for forming metal current collector for electrodes of a battery cell, which are disclosed in the United States Patent Publication Application Nos. 20020177032 to Suenaga; 20030203282 to Grugeon; 20040248010 to Kato et al.; and the U.S. Pat. No. 6,761,744 to Tsukamato et al. These aforementioned prior art methods share at least one disadvantage such as the active layer formed on top of the metal current collector of the electrodes to define a space therebetween, which negatively impacts cycleability and possibility to properly function in applications requiring higher C-rate. Another disadvantage of the methods mentioned above that negatively impacts both the life span of the battery and the manufacturing costs associates therewith is the structure of the battery wherein the active layer is formed on the metal current collector and additional binders used as adhesion between the active layer and the metal current collector thereby increasing both the weight and size of the battery, which, as mentioned above, negatively impacts both specific characteristics of the battery and the manufacturing costs associates therewith.

Alluding to the above, none of these prior art references teaches the method of forming the electrode which leads to an improved battery having the electrode with accessible porosity sufficient for penetration of electrolyte to contact with particles of the active material, conducting agent should provide contact of active substance particles with current collector. In the normal process of gas dynamic (cold spray) deposition, only metallic particles can be deposited on metallic substrate. The ceramic particles are inculcated in metal collector and do not form the necessary porosity. Introduction of a metal powder into mixture with the ceramic components leads to plastic deformation of metal particles at their collision with ceramic particles. As a result of plastic deformation metal particles create films on ceramic particles of the active substance. The resulting material does not have sufficiently accessible pore structure and is characterized by low mechanic strength. In addition, electric contact of each particle with current collector is not provided. Furthermore, at high deposition energies, metal particles can fuse during collision. In this case, conglomerates are formed. Such conglomerates disturb the uniformity of the deposited material.

But even with the aforementioned technique, to the extent it is effective in some respect, there is always a need for an improved processes for engineering of porous electrodes that is light, thin, cost effective, have improved cycle ability, specific energy and power as well as ability to properly function in applications that depend upon higher C-rate and easy to manufacture.

SUMMARY OF THE INVENTION

A metal current collector of the present invention is formed from a metallic tape used to form a first electrode such as an anode and a second electrode such as cathode combined into a cell for producing electric power without limiting the scope of the present invention. The metal current collector of the first electrode and the second electrode has opposed sides defining an initial thickness. An active core is formed inside the metal current collector. The active core is formed from first particles being integral with and extending from the metal current collector of at least one of the first and second electrodes and second particles formed from material other that the first particles of the metal current collector. The first and second particles connect with one another to form a porous grid of a three dimensional configuration of the active core disposed inside the metal current collector thereby resulting in the metal current collector being integral with the active core and presenting a second thickness. Based on application requirements, the second thickness may be substantially the same or smaller than the first thickness. The active core is mixed with and covered by an electrolyte. A layer of isolating bar is continuously disposed about one of the opposed sides of the metal current collector of at least one of the first and second electrodes. An anode layer is formed from lithium, carbon or other covering the active core to extend co-planarly with the layer of isolating bar. An anode current collector is formed from copper, nickel or other metal to extend over the anode layer and the layer of isolating bar. An isolating layer extends over the anode current collector sandwiched between the anode layer and the isolating layer.

An advantage of the present invention is to provide a unique metal current collector of an electrode with integrated active core having a porous structure received by effective deposition of an active material into the metal current collector substrate in a binder free fashion while maintaining outstanding adhesion.

Another advantage of the present invention is to provide a current collector wherein an active layer is formed inside the current collector thereby increasing the specific characteristics of the cell.

Still another advantage of the present invention is to provide a unique method for fabricating the electrodes wherein the metal current collector presents nano-structured surface at low cost.

Still another advantage of the present invention is to provide an electrode material having an improved nano-structure which is utilized as at least cathode or anode of a fuel cell leading to low thermal stability and improved cycling ability.

Still another advantage of the present invention is to provide a unique method of forming the inventive electrode structure for the cell by virtue of a unique high-pressure deposition solidification method wherein the particles of active material and solidified drops formed as a result of formation of aerosol mixture form a grid presenting a continuous surface of the metal current collector of the electrode.

Still another advantage of the present invention is to provide the metal current collector for the electrode presenting stable operation in a broad range of discharge rates and operating temperatures.

Still another advantage of the present invention is to provide high-performance equipment and methodology for high speed deposition of the particle of the active material while suppressing it's possible thermo-chemical degradation.

The present inventive concept has various applications including and not limited to high efficiency thin-film photovoltaic solar cells for cost-effective renewable energy, fuel cell components such as catalytic membranes for environmentally friendly power supplies, super capacitors for smaller and lighter portable handheld devices such as cell phones, laptops, thin film sensors for more effective monitoring and control of temperature, illumination, and humidity, high-conductivity wires with low resistance adaptable for manufacturing of a wide variety of electronic devices, and the like.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2A illustrates is a perspective and segmental view of the metal current collector of the electrode and the first particles colliding therewith thereby melting the metal current collector with some particles partially entering the metal current collector;

FIG. 2B is a partially cross sectional view of the electrode having the metal current collector of FIG. 2A;

FIGS. 4A through 4E illustrate various cross sectional view of the metal current collector of the present invention as the metal current collector is moved along an assembly path with the active core being formed inside the metal current collector;

FIG. 5 shows a schematic vie of the assembly of the cell by combining the electrodes of opposite polarity with each electrode having inventive active core inside the current collector;

DETAILED DESCRIPTION OF THE PREFERRED EMBODIMENT

Figure 1A:
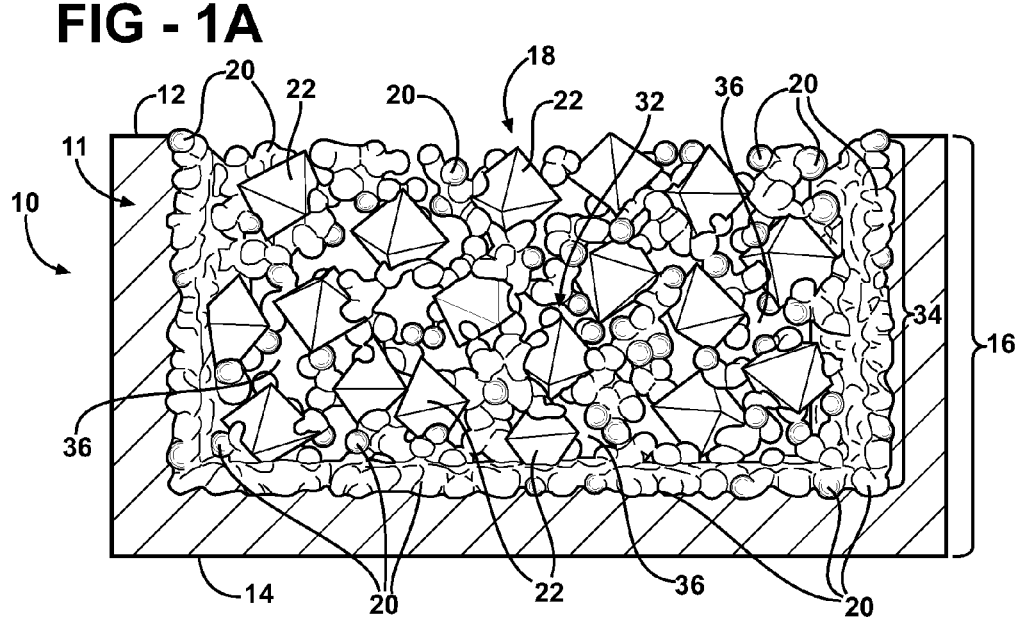
FIG. 1A illustrates cross sectional view of a structure on an inventive metal current collector for electrodes of opposite polarity wherein particles of an active material are represented by crystals or amorphous particles interconnected with a multitude of other particles of circular shape representing accreted and crystallized drops of melted metal current collector.
Figure 1B:
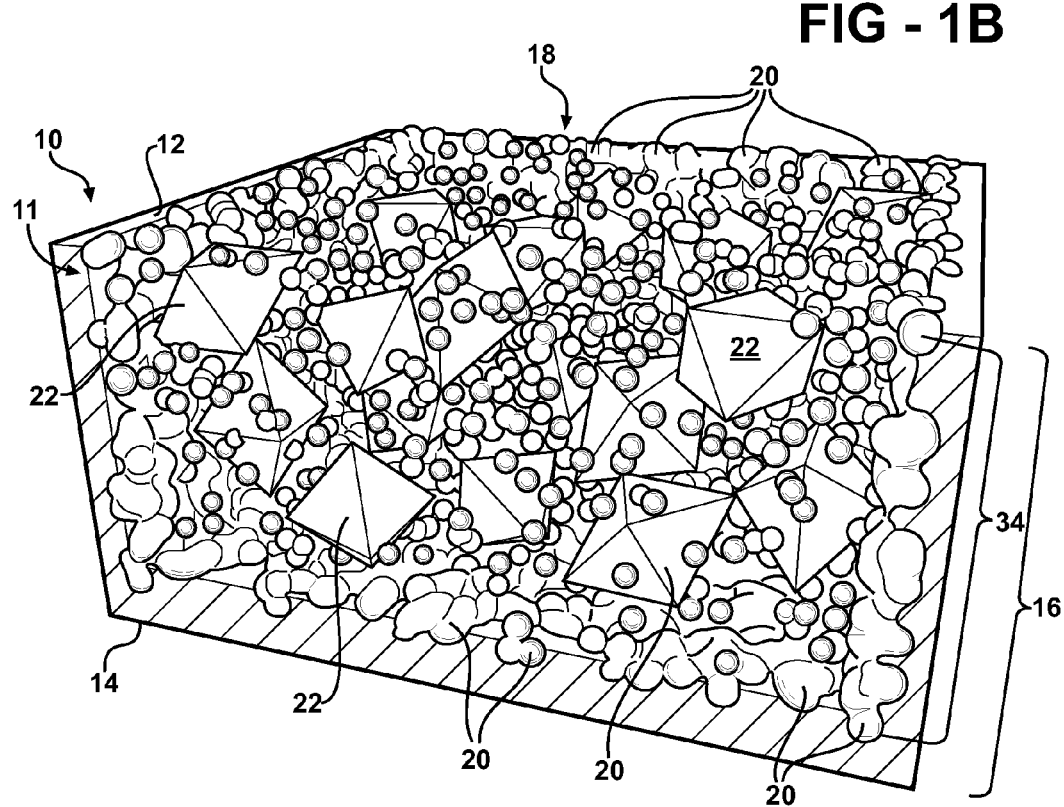
FIG. 1B illustrates a perspective view of the structure of the metal current collector of an electrode of FIG. 1A.
Figure 2C:
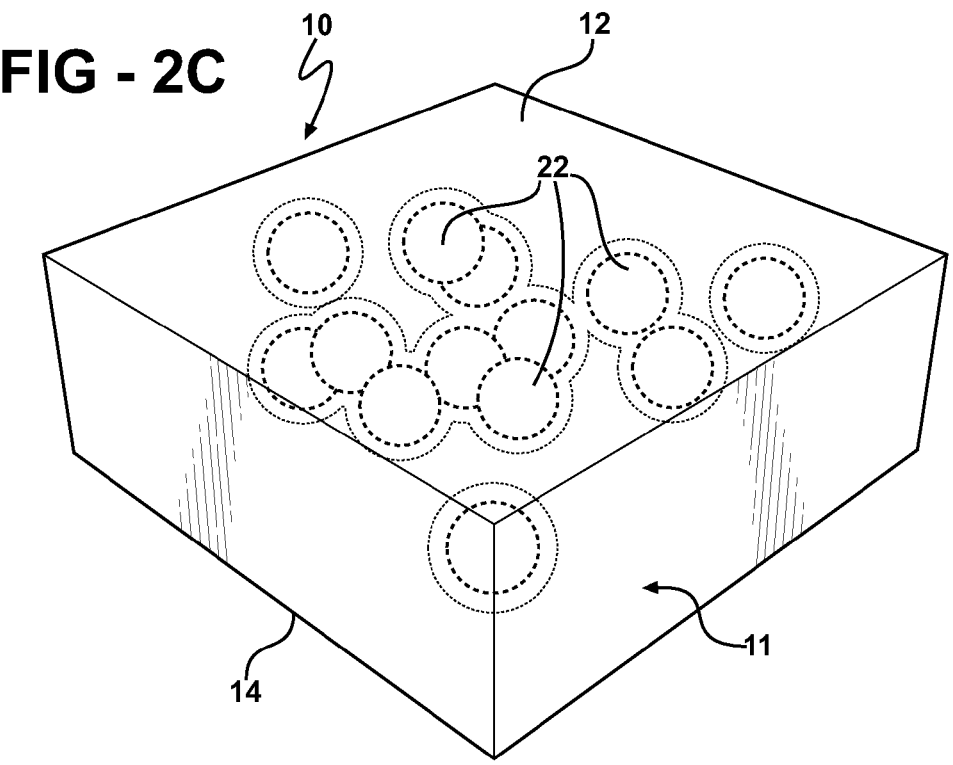
FIG. 2C illustrates is a perspective and segmental view of the metal current collector and the first particles disposed inside the metal current collector with the areas of local melting of current collector shown in phantom.
Figure 2D:
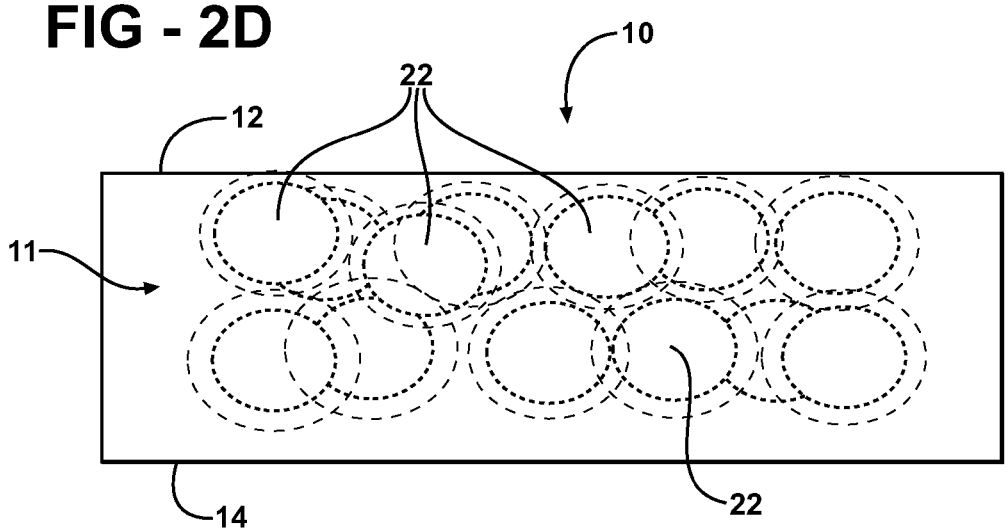
FIG. 2D is a partially cross sectional view of the metal current collector of FIG. 2C with the first particles shown in phantom.
Figure 2E:
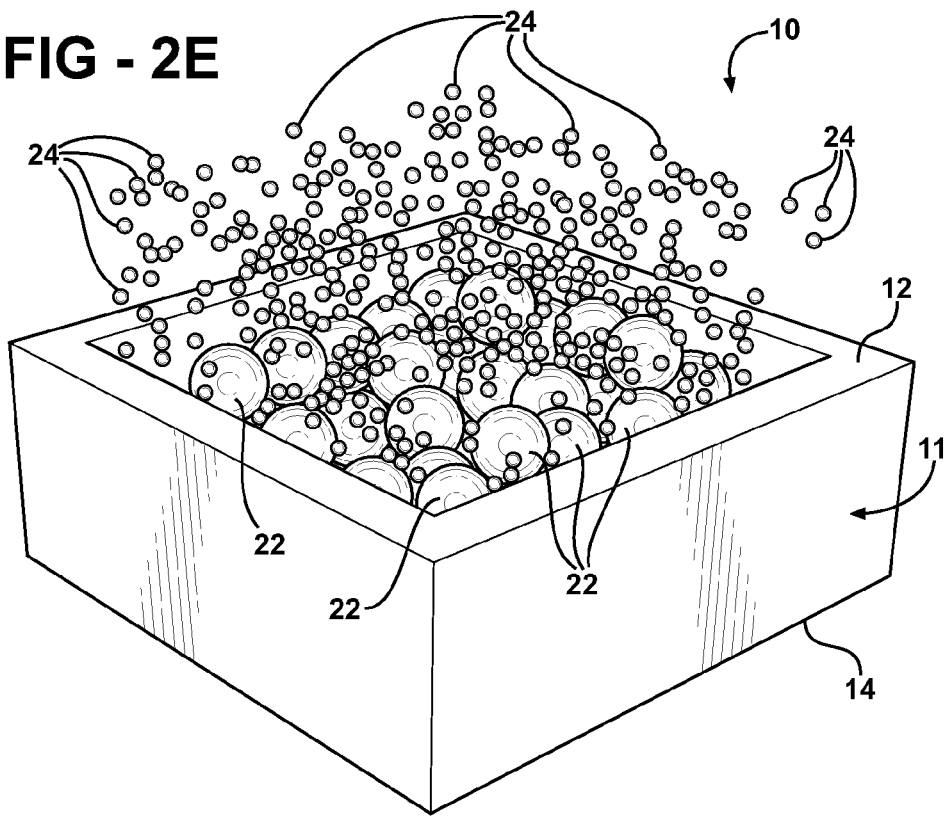
FIG. 2E illustrates is a perspective and segmental view of the metal current collector and the metal drops splashed from the metal current collector as in response to the impact of the first particles against the metal current collector and applying ultrasonic vibration.
Figure 2F:
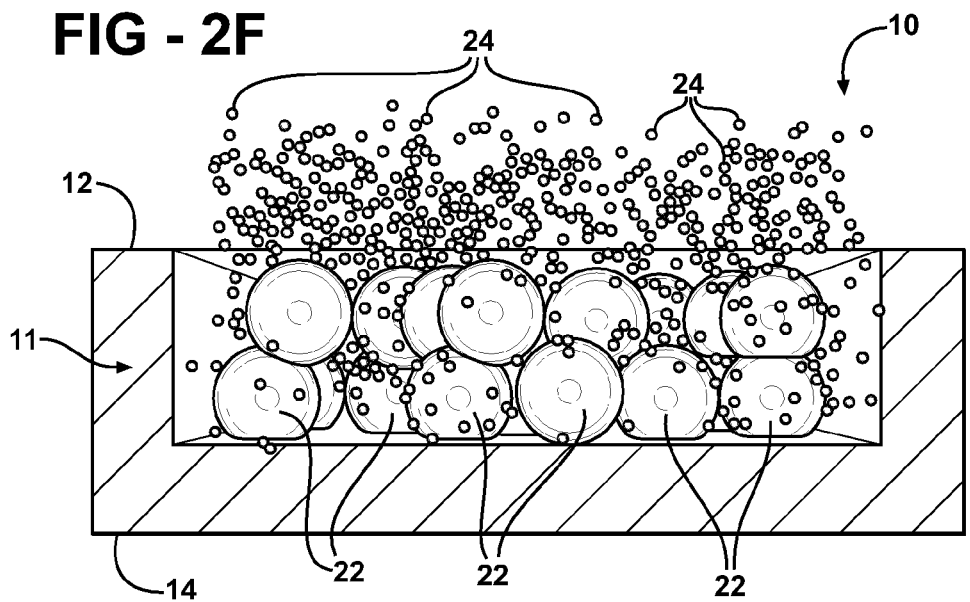
FIG. 2F is a partially cross sectional view of the electrode of FIG. 2E.
Figure 2G:
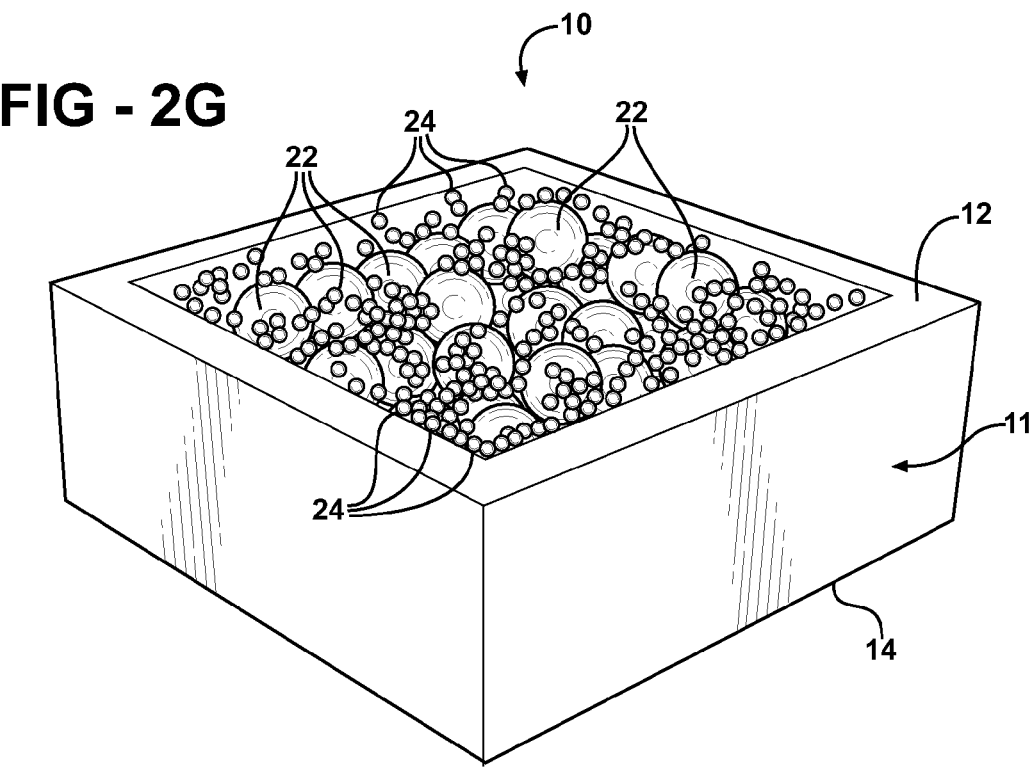
FIG. 2G illustrates is a perspective and segmental view of the metal current collector and the metal drops solidified in the shaped of the second particles and interconnected with the first particles to form a grid of a porous structure of an active core inside the metal current collector.
Figure 2H:
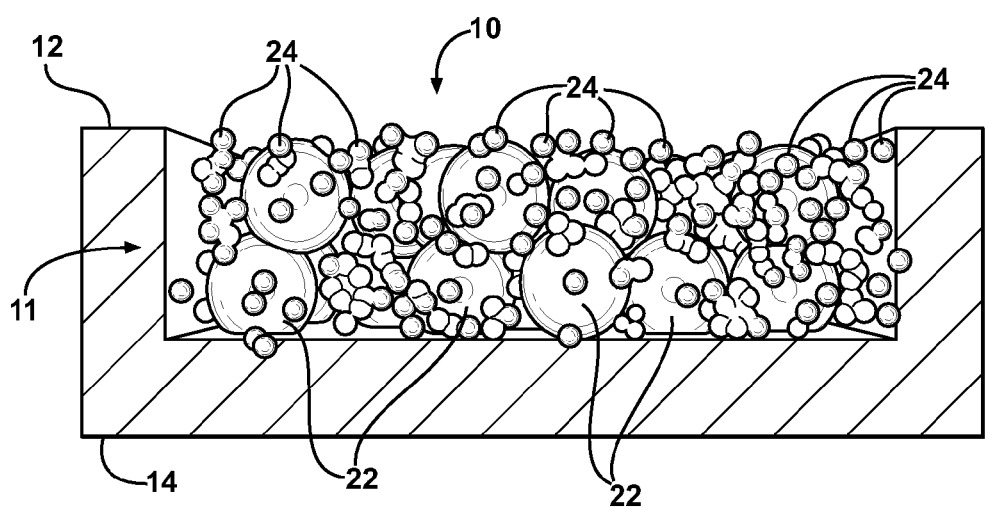
FIG. 2H is a partially cross sectional view of the metal current collector of FIG. 2G.

Referring to the Figures, wherein like numerals indicate like or corresponding parts, an electrode of the present invention is generally shown at 10. The electrode 10 of the present invention is formed from a metallic tape, generally indicated at 11 and shown fragmentally in FIGS. 1A to 2H, is used to form a first electrode such as an anode and a second electrode such as cathode, both illustrated at A and C, respectively, in FIGS. 5 and 8B and 8C, and spaced by a separator S and combined into a cell, generally indicated at 13 in FIG. 8A, for producing electric power without limiting the scope of the present invention. The metal current collector 11 of the first electrode and the second electrode has opposed sides 12 and 14 defining an initial thickness 16, as best illustrated in a cross sectional view shown in FIG. 1A. An active core, generally shown at 18 in FIG. 1A, is formed inside the metal current collector 10. The active core 18 is formed from first particles 20 being integral with and extending from the metal current collector 11 of at least one of the first and second electrodes. The first particles 20 are formed as the second particle 22, impacting the metal current collector 11, as best shown in FIGS. 2A and 2B, resulting in local increased temperature of the metal current collector 11, which locally melts, as shown in FIGS. 2C and 2D, as the second particles 22 are at least partially penetrate the metal current collector 11. As best illustrated in FIGS. 2E and 2F, the impact of the second particles 22 onto the melted metal current collector 11 results in multitude of aerosol drops 24 separated from the metal current collector 11, as best illustrated in FIGS. 2E and 2F. The active core 18 is formed in response to solidification of the aerosol drops 24, which follows local melting and ultrasonic cavitations of the metal current collector 11 thereby forming the first particles 20. The first particles 20 are integral with the metal current collector and present circular or globular configuration, as view in a cross section. The second particles are formed from of active material, other that the metal current collector 11, and may present a rectangular configuration, or other configuration, and the like, as best shown in FIGS. 1A and 1B, without limiting the scope of the present invention. The circular configuration of the second particles 22, as shown in FIGS. 2A through 2H are for illustrative purposes only without intent to limit the scope of the present invention. the active material of the second particles 22 includes and not limited to silicon, carbon, germanium, oxides, salts, ceramic components, $LiCoO_2$, $LiMn_2O_4$, $LiFePO_4$, $MnO_2$, Li, Si, C, Ge, SnO, $SnO_2$, and the like, without limiting the scope of the present invention.

The first and second particles 20 and 22 are connected with one another to form a porous grid, generally indicated at 32 in FIGS. 1A and 1B of a three dimensional configuration of the active core 18 disposed inside the metal current collector 11 thereby resulting in the metal current collector 11 being integral with the active core 18 and presenting a second thickness 34. The grid 32 is further defined by the first particles 20 being continuously connected with the metal current collector 11 thereby eliminating sharp interface between the grid 32 and the metal current collector 11. The first particles 20 are connected to the second particles 22 and the metal current collector 11 in a diffusible fashion with the second particles 22 being at least partially exposed through and beyond the grid 32. Alternatively, the second particles 22 are inside the grid 32 of the active core 18 and do not exposed beyond the active core 18. The first particles 20 and the second particles 22 are free from low conductivity films at interface defined between the first and second particles 20 and 22 and the metal current collector 11. The first particles 20 are fused with one and the other thereby forming an inter-layered structure of the grid 32 with the second particles 22 disposed therebetween. The second particles 22 and the metal current collector 11 define points of contacts having a thermal decomposition temperature being lower than a melting temperature of the first particles 20. The second particles 22 present a size ranging from at least 50 nm and up to 500 nm. The first particles 20 present a size ranging from at least 5 nm and up to 100 nm.

Based on application requirements, the second thickness 34 may be substantially the same or smaller than the first thickness 16. The grid 32 presents a plurality of pores, only some of the pores are shown at 36 in FIG. 1A. The grid 32 may present 60 percent of the pores 36 and 40 percent of the first and second particles 20 and 22 of a total volume of the active core 18. This ratio is not intended to limit the scope of the present invention. The pores 36 may present up to 80 percent of the active core 18 or only 0.55 percent of the active core 18. This ratio is not intended to limit the scope of the present invention. The active core 18 is mixed with and covered by an electrolyte, as best shown at 38 in FIG. 4C. The electrolyte 38 may be liquid or non-liquid.

Alluding to the above, one of the advantages of the present invention is the absence of an oxide film at contact points the first and second particles 20 and 22, which reduces electronic resistance at the interface of the cathode's C active substance and metal binding. Multitude of contact points defined between the particles 20 and 22 and the metal current collector 11 expose the greater part of the active core 18 open to electrochemical interaction with the electrolyte. The size of the first particles 20 as viewed in cross section is between 5 to 100 nm. The size of the second particles 22 formed from the active substance is between 50 to 500 nm. Based on the results conducted by the applicant through a quantitative electron-microscopic inspection, the average number of contacts of the metal, i.e. the first particles 20 and the metal current collector 10 with the second particles 22 of the active material is 25-32 per square micron of particle surface, thereby providing reliable and improved outlet of electrons to the metal current collector 10 during cyclic changes in active substance particle size during reversible electrode operation in the cell 13. In some applications of the present invention the three-dimensional grid 32 has low thickness and the second particles 22 of form the dense one layer film on the electrode surface.

Figure 3A:
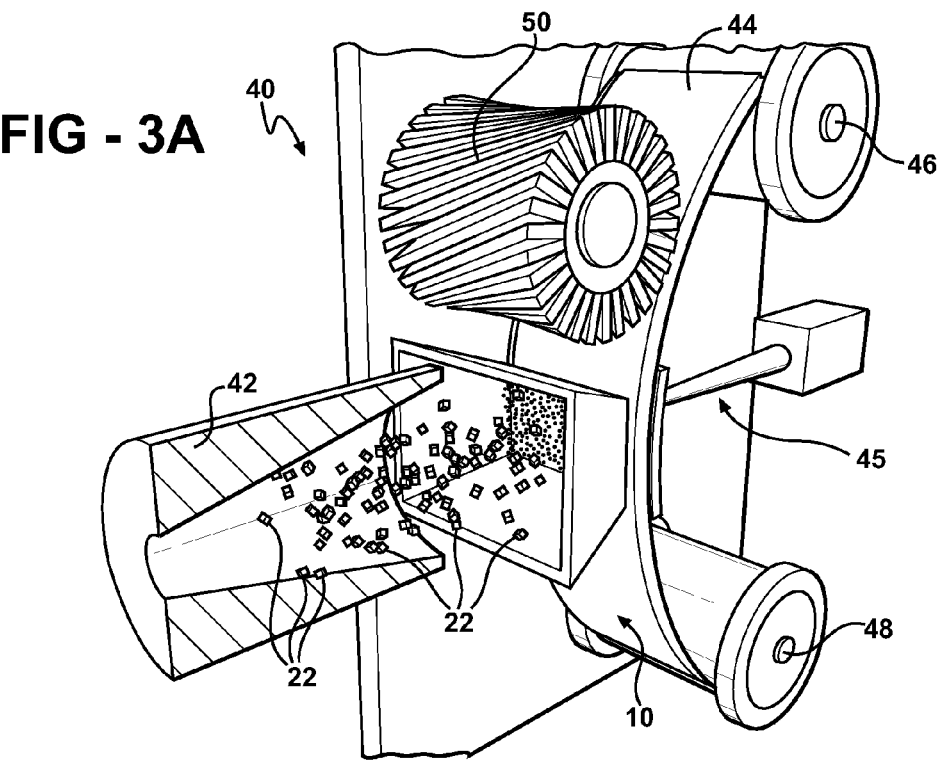
FIG. 3A illustrates a perspective view of an apparatus for forming the electrode having the metal current collector disposed therein.
Figure 3B:
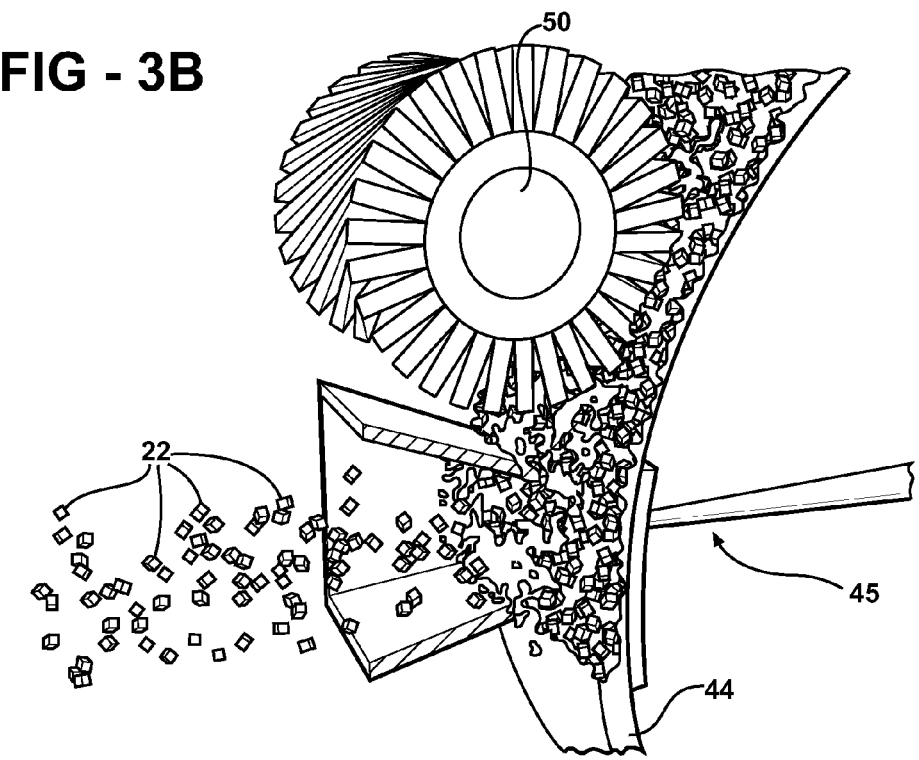
FIG. 3B illustrated a fragmental view of the apparatus shown in FIG. 3A.
Figure 8A:
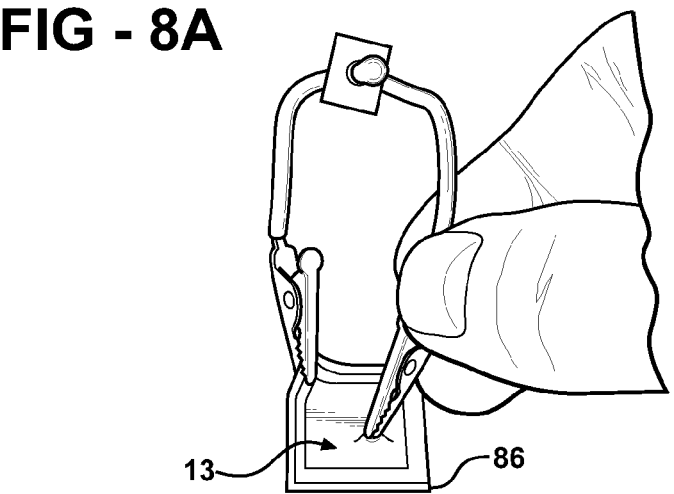
FIG. 8A is a perspective view of at least one configuration of the inventive cell.
Figure 8B:
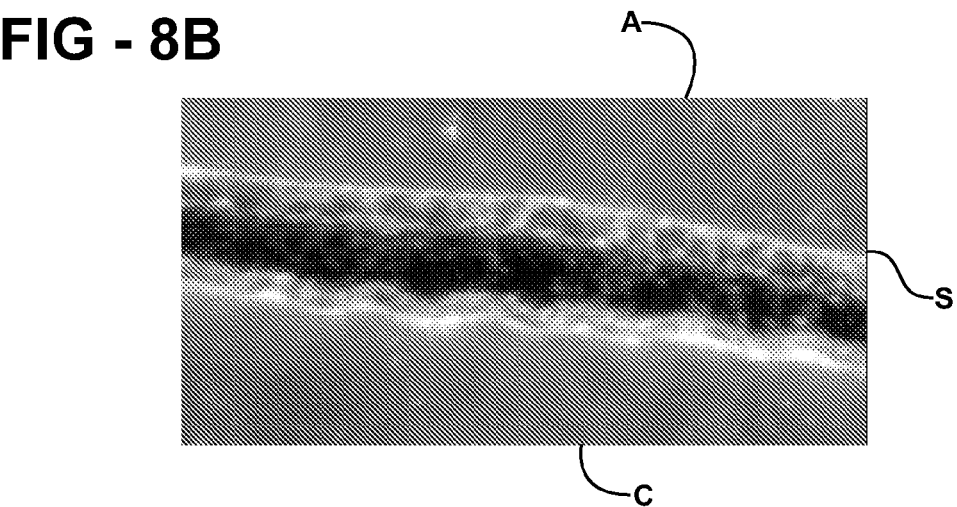
FIGS. 8B and 8C show a microscopic views of the cross section of the thin cell with at least one electrode formed according to present invention.
Figure 8C:
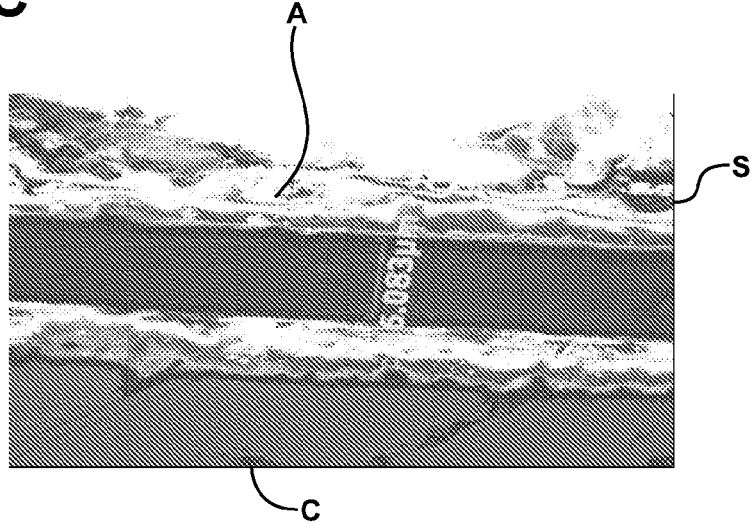

FIGS. 3A and 3B illustrate fragmental view of the inventive apparatus 40 of the present invention, which is described in great details in the patent application serial number incorporated herewith in its entirety. FIGS. 3A and 3B illustrate a nozzle 42 through which the second particles 22 of the active material are injected onto the tape 44 of the electrode 10 rolled between a pair of rollers 46 and 48. An ultrasonic vibrator, generally shown at 45 in FIGS. 3A and 3B, is positioned to abut the inner side of the tape 44. The functional aspects and purpose of the ultrasonic vibrator 45 are disclosed in the patent application Ser. No. 11/560,922 incorporated herewith by reference in its entirety. A brush 50 is positioned adjacent the tape 44 to extract excess of the first and second particles 20 and 22. FIGS. 4A through 4E illustrate various cross sectional view of the electrode 10 of the present invention as the metal current collector 11 is moved along an assembly path with the active core 18 being formed inside the metal current collector 11. As the active core 18 is formed inside the metal current collector 11, as described above, and is filled and/or mixed with the electrolyte 38, a layer of isolating bar 60 is continuously disposed about one of the opposed sides 12 of the electrode 10 of at least one of the first and second electrodes. In one embodiment, the electrode 10 can be an anode and can also include an anode layer 62 formed from lithium covering the active core 18 to extend co-planarly with the layer of isolating bar 60. In such an embodiment, an anode current collector 64 formed from copper, nickel or other metal can extend over the anode layer 62 and the layer of the isolating bar 60. An isolating layer 66 extends over the anode current collector 64 sandwiched between the anode layer 62 and the isolating layer 66. The structure of the electrode 10 as set forth above is applicable to both the anode A and the cathode C of the present invention. FIGS. 8B and 8C illustrate a cross section of the cell includes the anode A and the cathode C formed by the method of the present invention, clearly illustrating the dimensions of the anode A of 15 µm, the cathode of 9 µm, and the separator S of 10 µm. The table shown further below illustrates dimensions and technical characteristics of the preferred embodiment of the cell 13 of the present invention. However, these dimensions are illustrated for exemplary purposes as one of the embodiment of the present invention and are not intended to limit the scope of the present invention.

| Cathode - Al current collector with active substance LiMn2O4 | Thickness, µm | 9 |
|---|---|---|
| | Δm, mg/cm² | 0.7-0.9 |
| Separator + polymer electrolyte | Thickness, µm | 10-16 |
| Anode - Cu current collector with Li | Thickness, µm | 15 |
| Total of battery | Expectancy Thickness, µm | 40 |
| | Real Thickness, µm See Ris. 2. | 50 |
| | Capacity, mAh/cm2 at low current | 0.07-0.09 |
| | Volume, cm³ | 0.01 |
| | Capacity, mAh at low current discharge | 0.18 |
| | Average voltage, V at low current discharge | 3.9 |
| | Energy density Wh/l | 70 |
| | Peak Power W/l | >500 |

As best illustrated in FIG. 5 an assembly "roll to roll" process of the present invention is generally shown at 68. The cathode C and the anode A are rolled from two spaced drums 70 and 72 along an assembly path 74 with the metal current collector 10 of each of the cathode C and the anode A facing one another. An electrolyte with separator (if necessary) 76, either liquid or non-liquid is injected between the cathode C and the anode A in addition to the electrolyte 38 of the metal current collector 10. A heating element (not shown) is adjacent the assembly path 74 to heat the electrolyte 76 thereby improving polymerization of the electrolyte 76. After the cathode c and the anode A are sealed 80 a pair of cutting devices 82 and 84 disposed on both sides of the assembly path 74 are cutting the assembled cathode C and the anode A to a multitude of prefabricated cells 13. Numerous mechanical, laser, and electrical devices are used as cutting devices 82 and 84 and are not intended to limit the scope of the present invention. The cells 13 are sealed hermetically along the peripheral edge or the periphery 86.

Figure 6C:
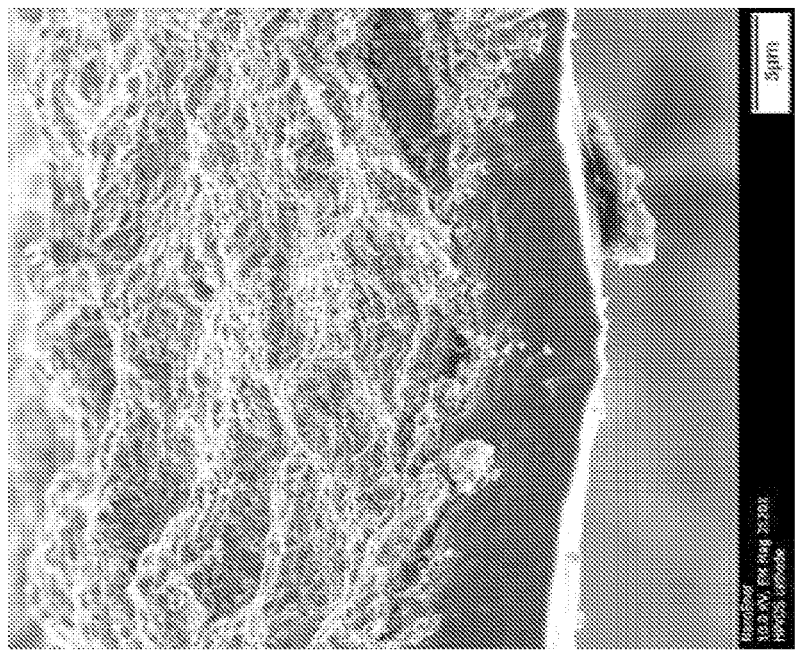
FIG. 6C illustrate the cross section structure of the electrode with the active layer deposited inside current collector shown in the FIG. 6B.
Figure 6B:
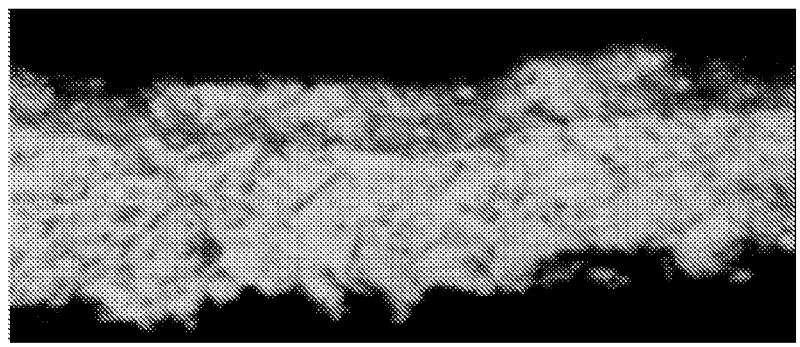
FIG. 6B illustrate the cross section structure of initial aluminum current collector before the active material deposition.
Figure 6A:
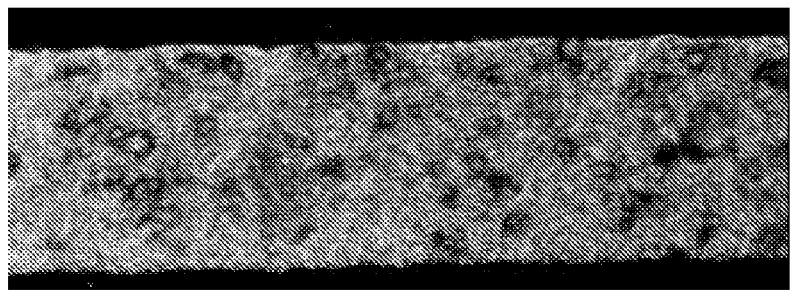
FIG. 6A illustrate various microscopic views of fracture of the inventive electrode to clearly illustrate the first and second nano-particles of the active core with each of the particles having nano-dimensions.
Figure 7:
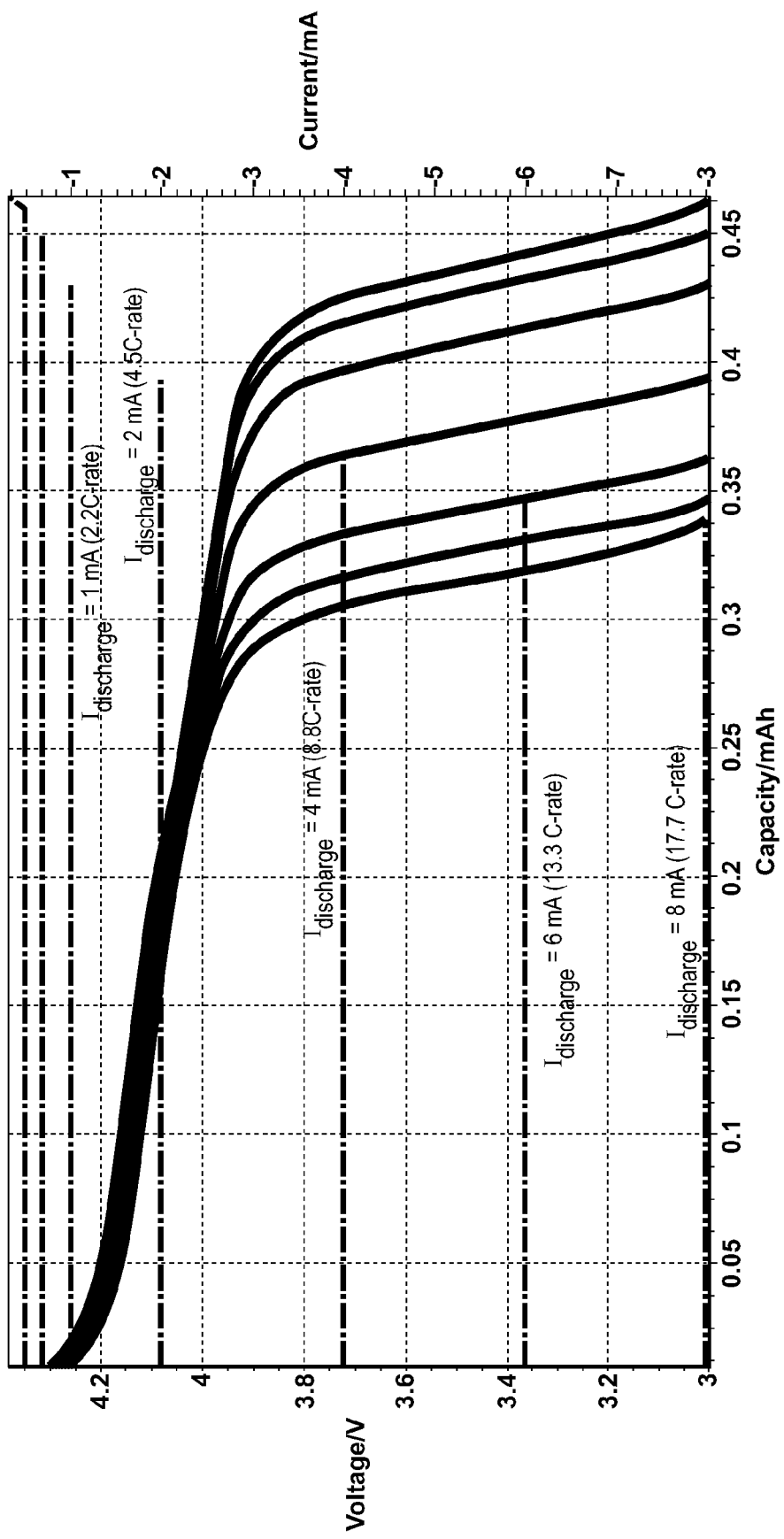
FIG. 7 presents a graph illustrating electrochemical testing results of the cell having a cathode electrode formed according to the present invention.
Figure 9:
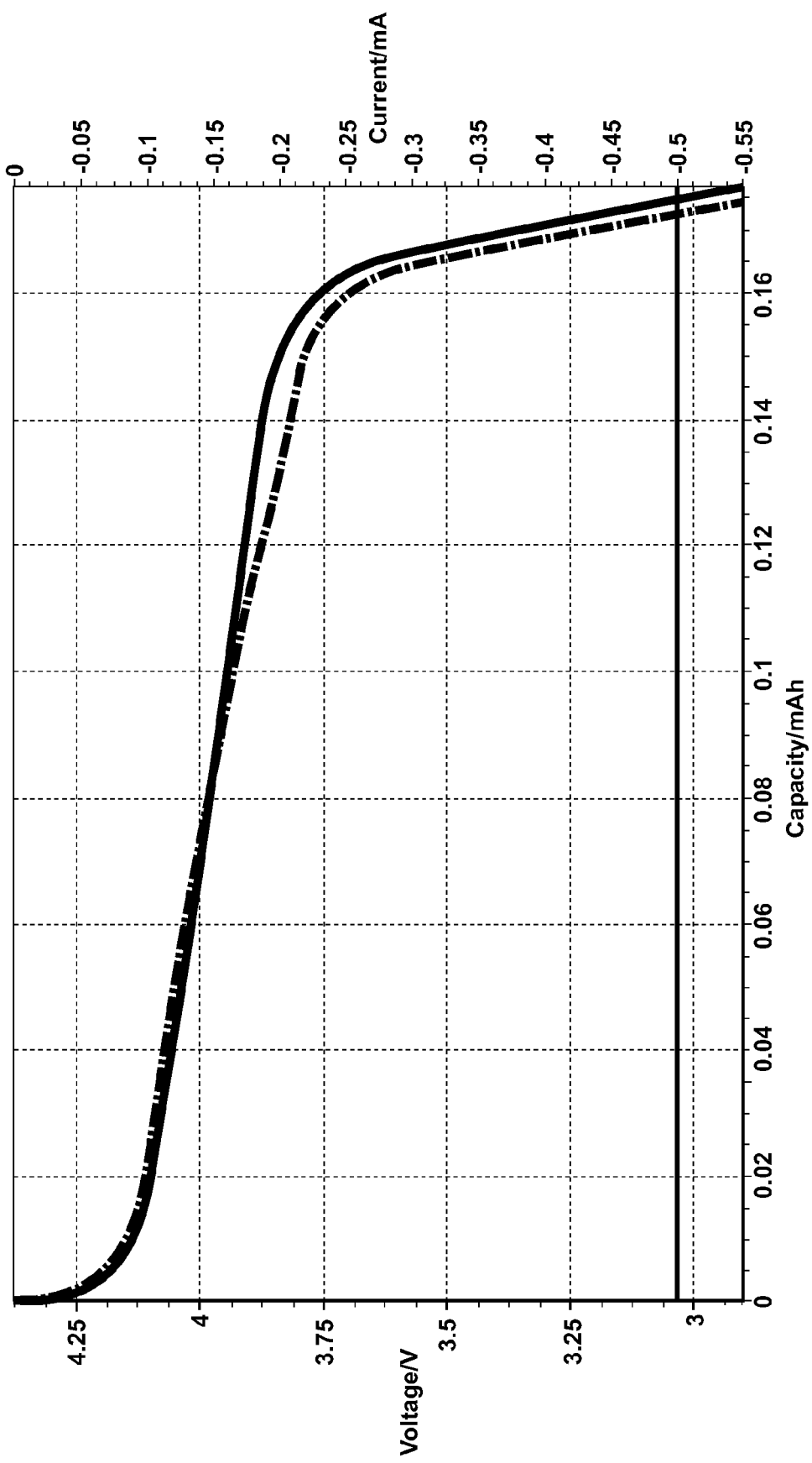
FIG. 9 presents another graph illustrating electrochemical testing results of the cell having at least one electrode formed according to the present invention.

FIGS. 6A through 6C illustrate various cross section microscopic views to clearly illustrate the first and second nano-particles 20 and 22 of the active core 18 with each of the particles having nano-dimensions. FIG. 7 presents a graph illustrating electrochemical testing results of cathode electrode 10 formed according to the invention. FIG. 8A is a perspective view of at least one configuration of the inventive cell. FIGS. 8B and 8C show cross section microscopic views of the electrodes of opposite polarity with at least one electrode formed according to the invention. FIG. 9 presents another graph illustrating electrochemical testing results of the cell shown in the FIGS. 8 A-C having at least one electrode made according to the present invention.

Alluding to the above, the electrode 10 and the method of forming the same have numerous valuable advantages of the prior art electrodes and methods. One of the advantages, for example, is the unique structure of the electrode 10 wherein the active core 18 is formed in an organic binder free fashion, i.e. by the inventive method of solidification of the aerosol drops 24 of the metal current collector 10 and the particles 22 of active material while maintaining adhesion therebetween. Another advantage of the present invention is to provide a unique method for fabricating the electrodes A and/or C wherein the metal current collector 10 presents nano-structured surface, has low thermal stability and improved cycling life. The unique method of forming the electrodes A and/or C utilizes the high-pressure deposition solidification method wherein the particles 22 of the active material and the solidified drops 24 are formed as a result of the formation of the aerosol mixture form the grid 32 presenting a continuous surface of the metal current collector 10 of the electrodes A and/or C. The present inventive concept has various applications including and not limited to high efficiency thin-film photovoltaic solar cells for cost-effective renewable energy, fuel cell components such as catalytic membranes for environmentally friendly power supplies, super capacitors for smaller and lighter portable handheld devices such as cell phones, laptops, thin film sensors for more effective monitoring and control of temperature, illumination, and humidity, high-conductivity wires with low resistance adaptable for manufacturing of a wide variety of electronic devices, and the like.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A cell having a first electrode and a second electrode for producing electric power comprising:
   a metal current collector for at least one of the first and second electrodes presenting opposed sides; and
   an active core formed inside said metal current collector from first particles being integral with and extending from said metal current collector and second particles connecting with said first particles thereby forming a porous structure of said active core inside said metal current collector, wherein said first particles are further defined by accreted and crystallized drops of said metal of said metal current collector.

2. A cell as set forth in claim 1 wherein said second particles and said metal current collector define points of contact, said points of contact have a thermal decomposition temperature being lower than a melting temperature of said first particles.

3. A cell as set forth in claim 2 wherein said second particles present a size ranging from at least 50 nm and up to 500 nm and said first particles present a size ranging from at least 5 nm and up to 100 nm.

4. A cell as set forth in claim 3 wherein said pores defined by said grid are in the range of up to 60% of a volume of said active core.

5. A cell as set forth in claim 4 wherein said second particles are further defined by silicon, carbon, germanium, oxides, salts, ceramic components and combination thereof.

6. A cell as set forth in claim 3 wherein said grid is formed as a result of said second particle impacting said metal current collector resulting in local increased temperature of said metal current collector and formation of aerosol drops in response to said increased temperature, local melting and ultrasonic cavitation of said metal current collector and solidification of said aerosol drops thereby forming said first particles.

* * * * *